United States Patent
Jo et al.

(10) Patent No.: US 11,112,910 B2
(45) Date of Patent: Sep. 7, 2021

(54) SENSOR INCLUDING FIRST OPTICAL MEMBER WITH REFLECTION PROPERTY AND SECOND OPTICAL MEMBER WITH ABSORPTION PROPERTY CAPABLE OF ABSORBING LIGHT REFLECTED BY FIRST OPTICAL MEMBER AND ELECTRONIC DEVICE INCLUDING THE SAME

(71) Applicant: Samsung Electronics Co., Ltd., Gyeonggi-do (KR)

(72) Inventors: Jeonggyu Jo, Gyeonggi-do (KR); Hyeongsoon Park, Gyeonggi-do (KR); Bokyung Sim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/448,361

(22) Filed: Jun. 21, 2019

(65) Prior Publication Data
US 2019/0391702 A1 Dec. 26, 2019

(30) Foreign Application Priority Data
Jun. 22, 2018 (KR) .................. 10-2018-0072052

(51) Int. Cl.
*G06F 3/042* (2006.01)
*G02F 1/1333* (2006.01)
(Continued)

(52) U.S. Cl.
CPC ........ *G06F 3/0421* (2013.01); *G02F 1/13338* (2013.01); *G02F 1/133509* (2013.01);
(Continued)

(58) Field of Classification Search
CPC .................................................. G06F 3/0421
See application file for complete search history.

(56) References Cited

U.S. PATENT DOCUMENTS

2014/0364707 A1* 12/2014 Kintz .................. A61B 5/1459
                                                         600/310
2016/0266695 A1*  9/2016 Bae ..................... G06F 3/04166
(Continued)

FOREIGN PATENT DOCUMENTS

JP          10-211176 A        8/1998
JP        2011-156011 A        8/2011
(Continued)

OTHER PUBLICATIONS

JP 2011156011 A—Google Patents Translation (Year: 2011).*
International Search Report dated Sep. 26, 2019.
International Search Report dated May 26, 2021.

*Primary Examiner* — Omar F Mojaddedi
(74) *Attorney, Agent, or Firm* — Cha & Reiter, LLC.

(57) ABSTRACT

According to an embodiment, an electronic device, comprises a transparent member, an optical sensor disposed under the transparent member and including a light transmitter configured to emit light of a designated wavelength band and a light receiver configured to obtain light of the designated wavelength band emitted from the light transmitter and reflected by an external object adjacent to the transparent member, a first optical filter disposed between the transparent member and the optical sensor, having a first transmittance for light of the designated wavelength band, and configured to reflect light outside the designated wavelength band, and a second optical filter disposed between the transparent member and the first optical filter, having a second transmittance less than the first transmittance for light of the designated wavelength band, and configured to absorb at least a portion of the light reflected by the first optical filter.

5 Claims, 9 Drawing Sheets

(51) Int. Cl.
  *G02F 1/1335*  (2006.01)
  *G06K 9/00*  (2006.01)
  *G06F 3/041*  (2006.01)
  *G09G 3/36*  (2006.01)

(52) U.S. Cl.
  CPC .......... *G06F 3/0412* (2013.01); *G06F 3/0428* (2013.01); *G06K 9/00013* (2013.01); *G06F 2203/04109* (2013.01); *G06K 2009/0006* (2013.01)

(56) References Cited

U.S. PATENT DOCUMENTS

| | | | |
|---|---|---|---|
| 2017/0344167 A1 | 11/2017 | Hsu et al. | |
| 2018/0098701 A1* | 4/2018 | Blomqvist | A61B 5/02438 |
| 2018/0129798 A1 | 5/2018 | He et al. | |
| 2018/0325397 A1* | 11/2018 | Presura | A61B 5/0535 |

FOREIGN PATENT DOCUMENTS

| | | |
|---|---|---|
| JP | 2017-140439 A | 8/2017 |
| WO | 2016/174303 A1 | 11/2016 |
| WO | 2017/062506 A1 | 4/2017 |
| WO | 2017/080869 A1 | 5/2017 |

\* cited by examiner

SENSOR INCLUDING FIRST OPTICAL MEMBER WITH REFLECTION PROPERTY AND SECOND OPTICAL MEMBER WITH ABSORPTION PROPERTY CAPABLE OF ABSORBING LIGHT REFLECTED BY FIRST OPTICAL MEMBER AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2018-0072052, filed on Jun. 22, 2018, in the Korean Intellectual Property Office, the disclosure of which is herein incorporated by reference in its entirety.

BACKGROUND

Technical Field

Certain embodiments of the disclosure relate to electronic devices, e.g., electronic devices including a sensor such as an optical sensor or biometric sensor.

Description of Related Art

An electronic device performs a particular function according to its equipped program. Some examples of such electronic devices include a home appliance, an electronic scheduler, a portable multimedia player, a mobile communication terminal, a tablet PC, a video/sound device, a desktop PC or laptop computer, a navigation device for an automobile, etc. As electronic devices are highly integrated and high-speed, high-volume wireless communication has become commonplace and mobile communication terminals have been equipped with an increasing variety of functions. For example, an electronic device comes with integrated functionalities, including entertainment functions such as playing video games, multimedia functions, replaying music/videos, communication and security functions for mobile banking, and scheduling or e-wallet functions.

It may be desirable to add a function detecting the user's health in a manner that does not detract from the appearance of the electronic device.

The above information is presented as background information only to assist with an understanding of the disclosure. No determination has been made, and no assertion is made, as to whether any of the above might be applicable as prior art with regard to the disclosure.

SUMMARY

According to an embodiment, an electronic device, comprises a transparent member; an optical sensor disposed under the transparent member and including a light transmitter configured to emit light of a designated wavelength band and a light receiver configured to obtain light of the designated wavelength band emitted from the light transmitter and reflected by an external object adjacent to the transparent member; a first optical filter disposed between the transparent member and the optical sensor, having a first transmittance for light of the designated wavelength band, and configured to reflect light outside the designated wavelength band; and a second optical filter disposed between the transparent member and the first optical filter, having a second transmittance less than the first transmittance for light of the designated wavelength band, and configured to absorb at least a portion of the light reflected by the first optical filter.

According to an embodiment, a sensor, comprises a light receiver, a first optical member disposed on the light receiver to transmit light having a designated wavelength band to the light receiver, and a second optical member disposed on the first optical member to transmit, at least, light of the designated wavelength band, wherein the first optical member is configured to reflect light of a wavelength band other than the designated wavelength band, and wherein the second optical member is configured to at least partially absorb the light reflected by the first optical member.

According to an embodiment, an electronic device, comprises a housing including a first surface, a second surface facing away from the first surface, and a side surface surrounding a space between the first surface and the second surface, and a sensor disposed inside the housing and configured to receive light through at least a portion of any one of the first surface, the second surface, or the side surface, wherein the sensor includes a light receiver, a first optical filter disposed on the light receiver to transmit light of a designated wavelength band to the light receiver, and a second optical filter disposed on the first optical filter to transmit, at least, light of the designated wavelength band, wherein the first optical filter is configured to reflect light of a second wavelength band other than the designated wavelength band, and wherein the second optical filter is configured to at least partially absorb the light reflected by the first optical filter.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
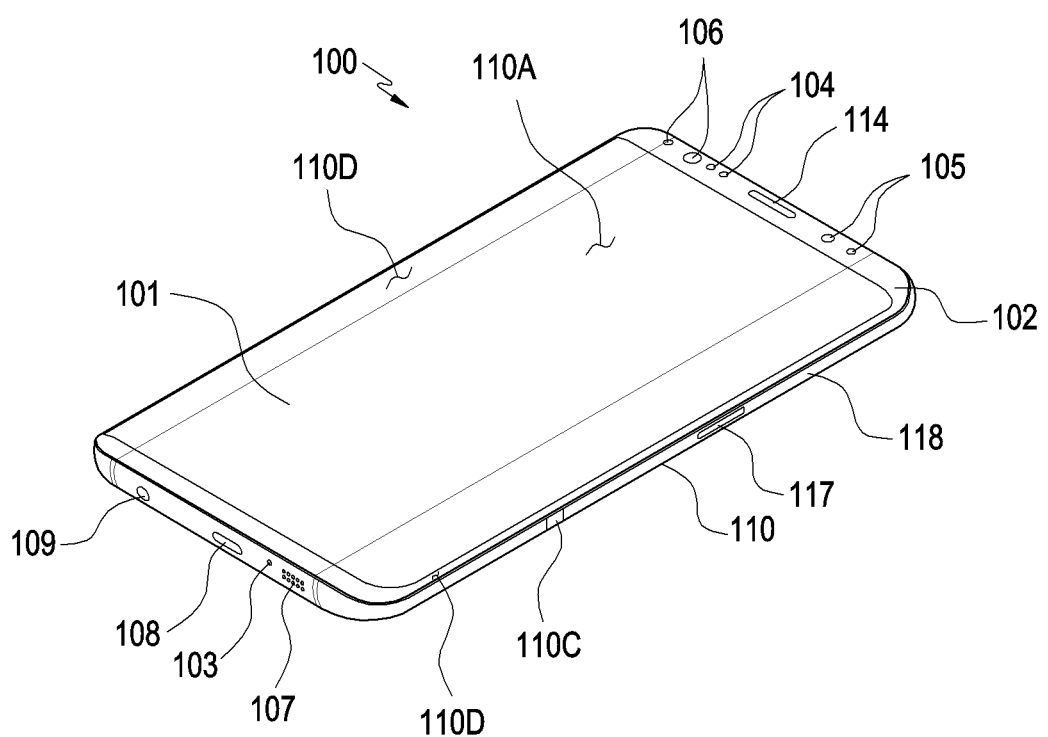
FIG. 1 is a front, perspective view illustrating an electronic device according to an embodiment.

Various changes may be made to the disclosure and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure.

With mobile terminals or other personal electronic devices in wide use, various types of services can be implemented online or offline. For example, electronic devices can have increased applications in medical service sectors by including various types of biometric sensors. Electronic devices may include a sensor(s) for detecting various information regarding the user's health condition such as blood pressure, blood sugar, blood flow, heartbeat information (e.g., heart rate monitor (HRM) or heart rate variability (HRV)), body temperature, or respiration rate thereby being able to produce, store, and transmit in real-time routine data necessary to manage the user's health condition.

Such a sensor typically has an electrode structure which directly contacts the user's body (e.g., skin) or an optical structure which directly contacts the user's body to detect biometric information.

The drawback of a sensor with an electrode structure is that it is at least partially exposed to the outside in order to come into direct contact with the user's body. Such exposure of sensor circuitry or part may detract from the aesthetic appearance of the electronic device.

The drawback of an optical sensor is that it is either visible (under the display) or reflects too much light causing a glare. An optical biometric sensor (photoplethysmogram (PPG)) may be able to detect biometric information based on a visible wavelength band or infrared (IR) wavelength band of light, but such a sensor may detract from the aesthetic appearance of the electronic device. For example, the light transmitter or light receiving part of the sensor, which may be externally visible, and have poor performance because the sensor receives light of unnecessary wavelengths. When a filter is disposed to prevent reception of an unnecessary wavelength band of light through the light receiving part, part of the light may be reflected by the filter. For example, the sensor may be partially visible to the outside or reflect external light, causing a glare. Each detract from the aesthetic appearance of the electronic device.

According to certain embodiments, a biometric sensor may be visually hidden in an electronic device, thereby improving the aesthetic appearance of the electronic device.

According to certain embodiments, a sensor adopting a filter structure may keep the sensor away from external exposure while maintaining measurement accuracy.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure. The term "and/or" may denote a combination(s) of a plurality of related items as listed or any of the items. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as necessary.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

According to certain an electronic device includes a housing, with a sensor therein.

Figure 9:
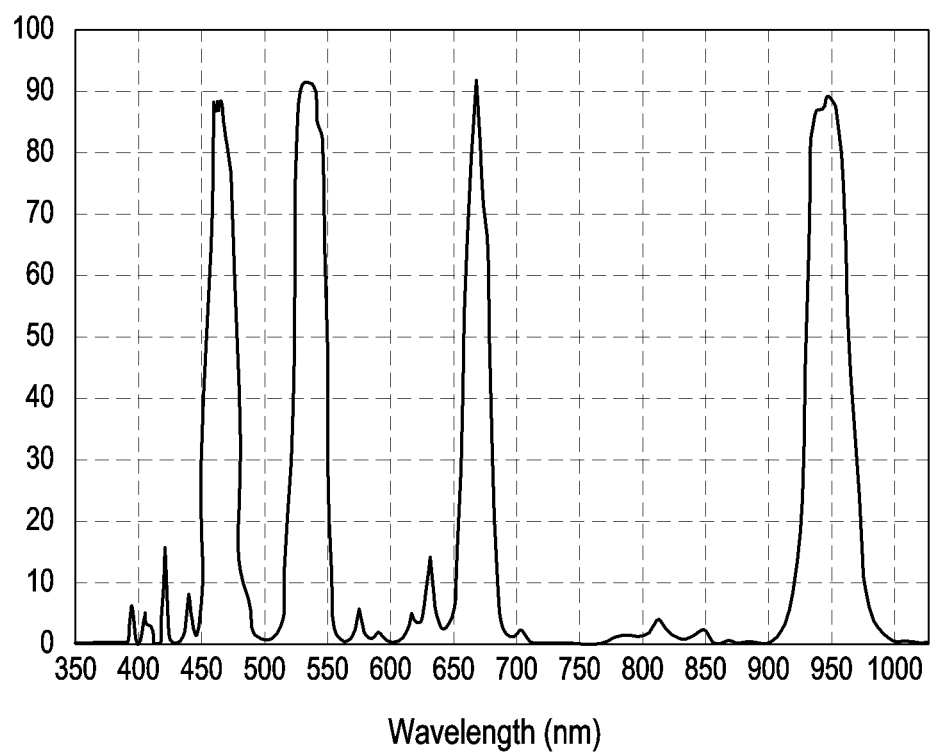
FIG. 9 and FIG. 10 are views illustrating the characteristics of an optical filter in a sensor of an electronic device according to an embodiment.
Figure 10:
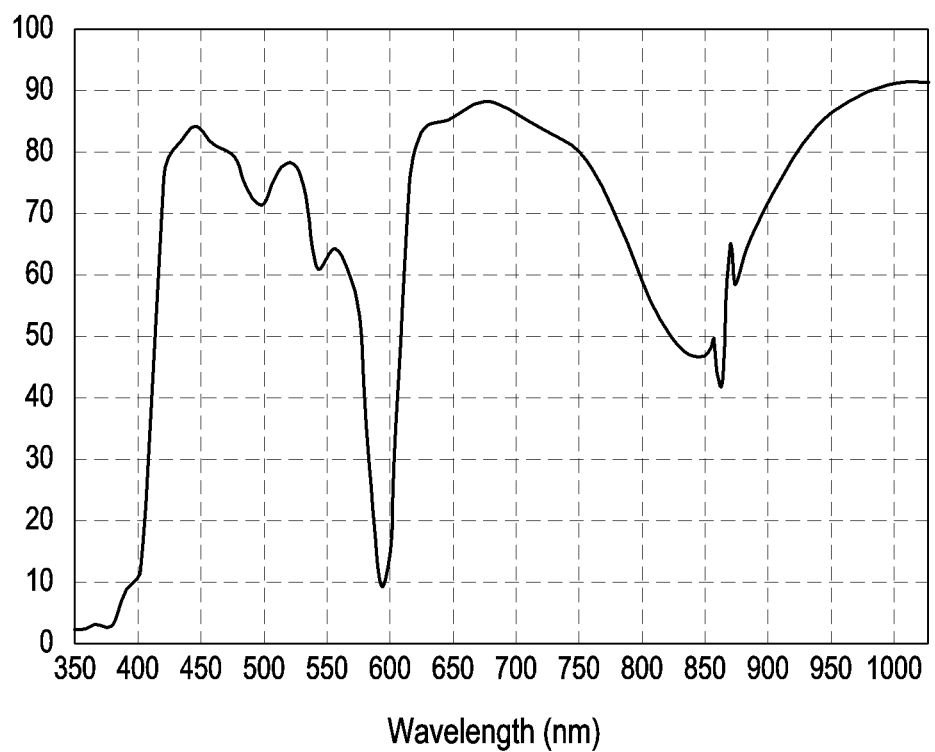
Figure 11:
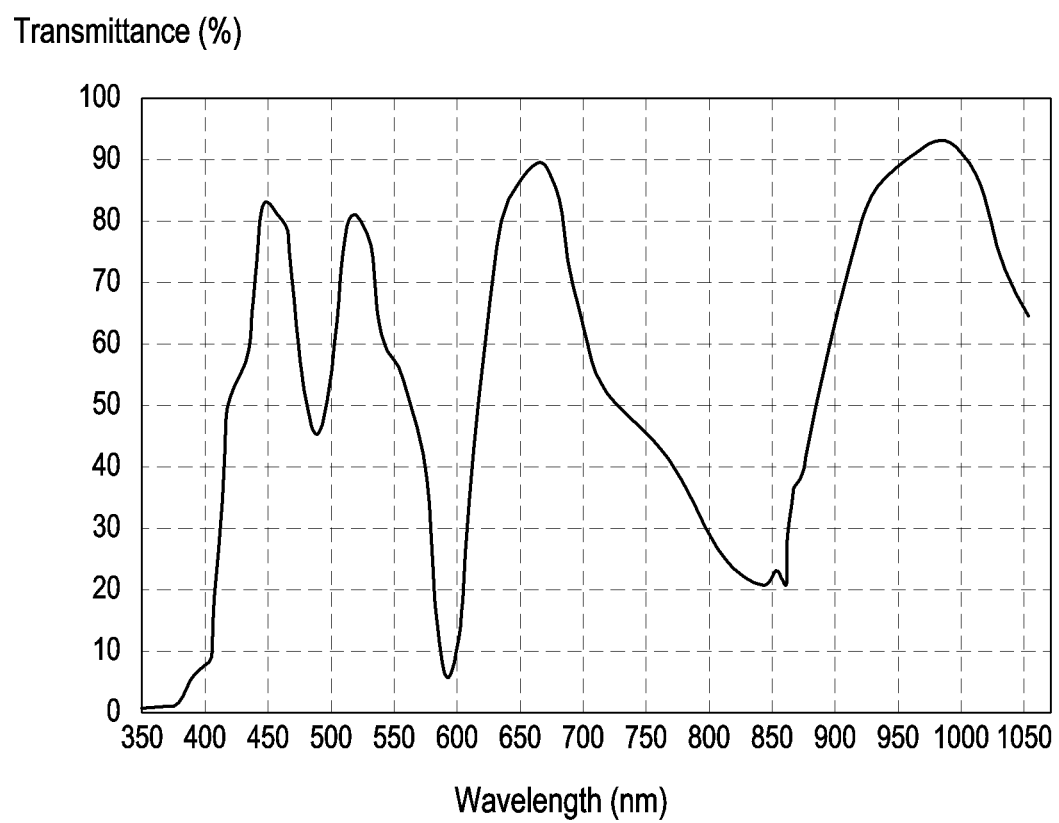
FIG. 11 is a view illustrating the characteristics of a hybrid filter combining a first optical filter and a second optical filter in a sensor of an electronic device according to an embodiment.

FIGS. 1-4 describe the housing of the electronic device and FIG. 5-8 describe the sensor assembly. FIGS. 9-11 describe the properties of the filters.

Housing

Figure 2:
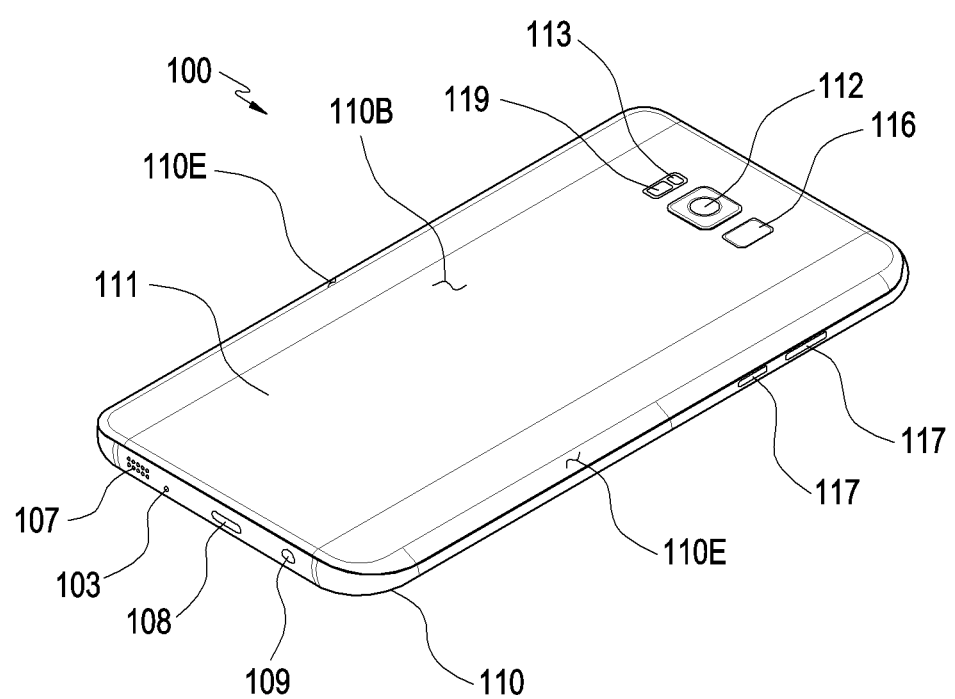
FIG. 2 is a rear, perspective view illustrating an electronic device as illustrated in FIG. 1.

FIG. 1 is a front perspective view illustrating an electronic device 100 according to an embodiment. FIG. 2 is a rear, perspective view illustrating an electronic device 100 as illustrated in FIG. 1.

Referring to FIGS. 1 and 2, according to an embodiment, an electronic device 100 may include a housing 110. The housing can have a first (or front) surface 110A, a second (or rear) surface 110B facing away from the first surface, and a side surface 110C. The side surface 110C surrounds a space between the first surface 110A and the second surface 110B.

According to another embodiment (not shown), the housing may denote a structure forming part of the first surface 110A, the second surface 110B, and the side surface 110C of FIG. 2. At least part of the first surface 110A may have a substantially transparent front plate 102 (e.g., a glass plate or polymer plate including various coat layers). The front plate 102 may be coupled with the housing 110 and, along with the housing 110, may form an internal space. Here, the 'internal space' may mean a space between the front plate 102 and a first supporting member (e.g., the first supporting member 311 of FIG. 3) described below. According to an embodiment, the 'internal space' may mean a space, as an internal space of the housing 110, for receiving at least part of the display 330 of FIG. 3 or the display 101 described below. A sensor biometric sensor can be disposed entirely within the housing.

According to an embodiment, the second surface 110B may be formed of a substantially opaque rear plate 111. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 118 that couples to the front plate 102 and the rear plate 111 and includes a metal and/or polymer. According to an embodiment, the rear plate 111 and the side bezel plate 118 may be integrally formed together and include the same material (e.g., a metal, such as aluminum).

In the embodiment illustrated, the front plate 102 may include two first regions 110D (e.g., the curved portions R of FIG. 3), which seamlessly and bendingly extend from the first surface 110A to the rear plate 111, on both the long edges of the front plate 102. In the embodiment (refer to FIG. 2) illustrated, the rear plate 111 may include second regions 110E, which seamlessly and bendingly extend from the second surface 110B to the front plate 102, on both the long edges. According to an embodiment, the front plate 102 (or the rear plate 111) may include only one of the first regions 110D (or the second regions 110E). Alternatively, the first regions 110D or the second regions 110E may partially be excluded. According to an embodiment, at the side view of the electronic device 100, the side bezel structure 118 may have a first thickness (or width) for sides (e.g., the side where the connector hole 108 is formed) that do not have the first regions 110D or the second regions 110E and a second thickness, which is smaller than the first thickness, for sides (e.g., the side where the key input device 117 is disposed) that have the first regions 110D or the second regions 110E.

According to an embodiment, the electronic device 100 may include at least one or more of a display 101, audio module 107, and 114, sensor modules 104, 116, and 119, camera modules 105, 112, and 113, key input devices 117, a light emitting device 106, and connector holes 108 and 109. According to an embodiment, the electronic device 100 may exclude at least one (e.g., the key input device 117 or the light emitting device 106) of the components or may add other components.

The display 101 may be exposed through the top of, e.g., the front plate 102. According to an embodiment, at least a portion of the display 101 may be exposed through the front plate 102 forming the first surface 110A and the first regions 110D of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101.

According to an embodiment, the screen display region (e.g., the active region), or a region (e.g., the inactive region) off the screen display region, of the display 101 may have a recess or opening in a portion thereof, and at least one or more of the audio module 114, sensor module 104, camera module 105, and light emitting device 106 may be aligned with the recess or opening. According to an embodiment (not shown), at least one or more of the audio module 114, sensor module 104, camera module 105, fingerprint sensor 116, and light emitting device 106 may be included on the rear surface of the screen display region of the display 101. According to an embodiment (not shown), the display 101 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 104 and 119 and/or at least part of the key input device 117 may be disposed in the first regions 110D and/or the second regions 110E.

The audio modules 103, 107, and 114 may include a microphone hole 103 and speaker holes 107 and 114. The microphone hole 103 may have a microphone inside to obtain external sounds. According to an embodiment, there may be a plurality of microphones to be able to detect the direction of a sound. The speaker holes 107 and 114 may include an external speaker hole 107 and a phone receiver hole 114. According to an embodiment, the speaker holes 107 and 114 and the microphone hole 103 may be implemented as a single hole, or speakers may be placed without the speaker holes 107 and 114 (e.g., piezo speakers).

The sensor modules 104, 116, and 119 may generate an electrical signal or data value corresponding to an internal operating state or external environmental state of the electronic device 100. The sensor modules 104, 116, and 119 may include a first sensor module 104 (e.g., a proximity sensor) and/or a second sensor module (not shown) (e.g., a fingerprint sensor) disposed on the first surface 110A of the housing 110 and/or a third sensor module 119 (e.g., a heart-rate monitor (HRM) sensor) and/or a fourth sensor module 116 (e.g., a fingerprint sensor) disposed on the second surface 110B of the housing 110. The fingerprint sensor may be disposed on the second surface 110A as well as on the first surface 110B (e.g., the display 101) of the housing 110. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

In certain embodiments, sensor module 104, 116, or 119 an optical sensor under transparent front plate 102. The optical sensor can transmit light having a designated wavelength band through the front plate 102 (or the rear plate 111) to be reflect off of an external object, such as a finger of the user. The reflected light can be filtered to include the portion that is in the wavelength band and received by the optical sensor. The optical sensor can provide various measurements from the received light, which then be used to detect a variety of things such as, for example, fingerprint, blood flow, blood oxygen levels, blood sugar levels, among other things.

To improve the appearance of the electronic device, the optical sensor is obscured by light. The optical filter uses light of a designated wavelength band. The filters permit transmission of light of the designated wavelength while absorbing light in wavelengths outside the designated wavelength band. The amount absorbed is sufficient to obscure the sensor, but not excessive to cause a glare.

The camera modules 105, 112, and 113 may include a first camera device 105 disposed on the first surface 110A of the electronic device 100, and a second camera device 112 and/or a flash 113 disposed on the second surface 110B. The camera modules 105 and 112 may include one or more lenses, an image sensor, and/or an image signal processor. The flash 113 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include the sensor module 116 disposed on the second surface 110B of the housing 110.

The light emitting device 106 may be disposed on, e.g., the first surface 110A of the housing 110. The light emitting device 106 may provide, e.g., information about the state of the electronic device 100 in the form of light. According to an embodiment, the light emitting device 106 may provide a light source that interacts with, e.g., the camera module 105. The light emitting device 106 may include, e.g., a light emitting diode (LED), an infrared (IR) LED, or a xenon lamp.

The connector holes 108 and 109 may include a first connector hole 108 for receiving a connector (e.g., a universal serial bus (USB) connector) for transmitting or receiving power and/or data to/from an external electronic device and/or a second connector hole 109 (e.g., an earphone jack) for receiving a connector for transmitting or receiving audio signals to/from the external electronic device.

Figure 3:
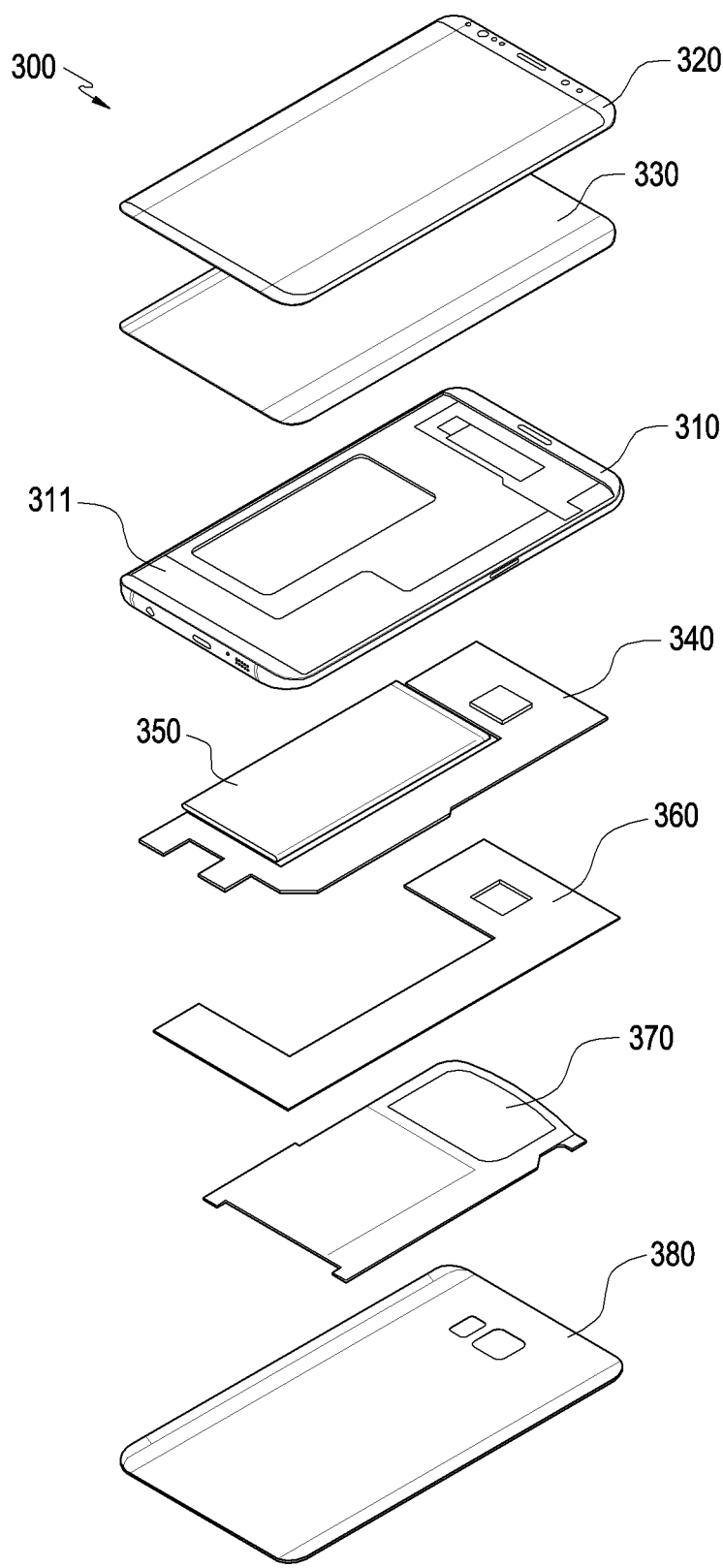
FIG. 3 is an exploded perspective view illustrating an electronic device as illustrated in FIG. 1.

FIG. 3 is an exploded perspective view illustrating an electronic device 300 as illustrated in FIG. 2.

Referring to FIG. 3, an electronic device 300 may include a side bezel structure 310, a first supporting member 311 (e.g., a bracket), a front plate 320, a display 330, a printed circuit board 340, a battery 350, a second supporting member 360 (e.g., a rear case), an antenna 370, and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 100 of FIG. 1 or FIG. 2 and no duplicate description is made below.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

Substantially the entire region of the display 330 may be attached on an inner surface of the front plate 320, and an opaque layer may be formed around or along the periphery of the region where the display 330 is attached on the inner surface of the front plate 320. In the region of the front plate 320 where the display 330 is not disposed, the opaque layer may prevent part of the internal structure (e.g., the first supporting member 311) of the electronic device 300 from being exposed to the outside.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrated or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the disclosure, an antenna structure may be formed by a portion or combination of the side bezel structure 310 and/or the first supporting member 311.

In certain embodiments, a sensor module 104, 116, or 119 an optical sensor can be positioned under the front plate 320. The optical sensor can transmit light having a designated wavelength band through the front plate 320 to be reflect off of an external object, such as a finger of the user. The reflected light can be filtered to include the portion that is in the wavelength band and received by the optical sensor. The optical sensor can provide various measurements from the received light, which then be used to detect a variety of things such as, for example, fingerprint, blood flow, blood oxygen levels, blood sugar levels, among other things.

Figure 4:
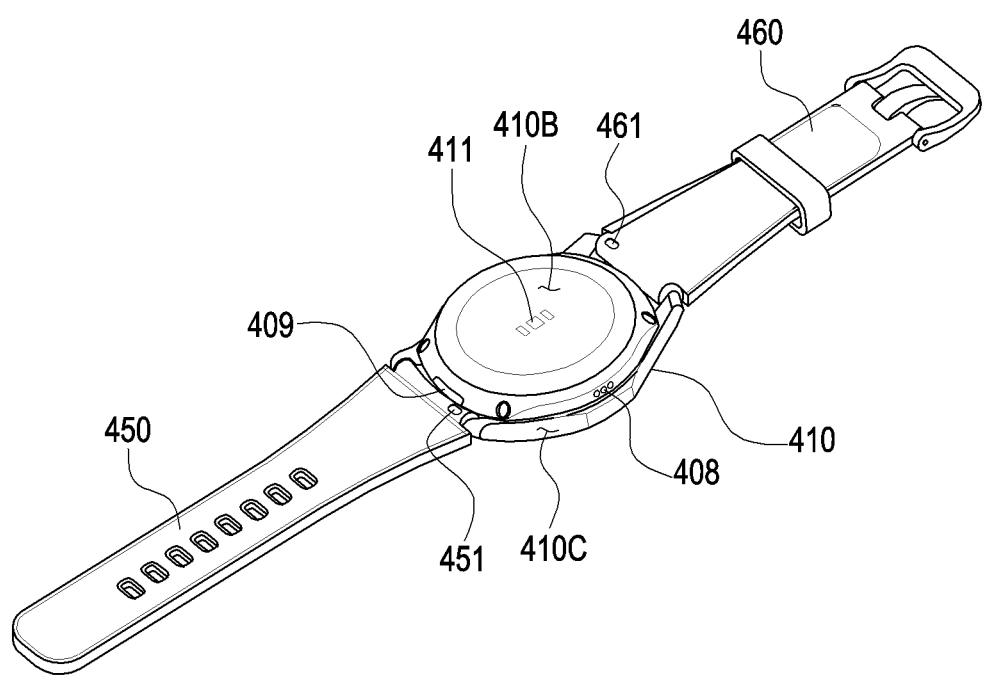
FIG. 4 is a rear, perspective view illustrating an electronic device according to an embodiment.

FIG. 4 is a rear, perspective view illustrating an electronic device 400 according to an embodiment.

Referring to FIG. 4, an electronic device 400 may include a housing 410 and coupling members 450 and 460 connected to at least part of the housing 410 which may detachably fasten the user's body part (e.g., the user's wrist or ankle) to the electronic device 400. According to another embodiment (not shown), the housing may denote a structure forming part of a first surface (e.g., a front surface), a second surface 410B (e.g., a rear surface), and side surfaces 410C, similar to the housing 110 of FIG. 1. The housing 410 may be similar in configuration to the housing 110 of FIG. 1, except for its shape, and no detailed description thereof is given. The coupling members 450 and 460 may be formed of various materials in various shapes. A uni-body structure or multiple unit links movably coupled to each other may be formed of fabric, leather, rubber, urethane, metal, ceramic, or a combination of at least two thereof.

According to an embodiment, the electronic device 400 may include at least one or more of a display (not shown), an audio module 408, a sensor module 411, a key input device (not shown), and a connector hole 409. According to an embodiment, the electronic device 400 may exclude at least one (e.g., the key input device, connector hole 409, or sensor module 411) of the components or may add other components. The audio module 408 may include a microphone hole and a speaker hole, which may readily be appreciated from the above-described embodiments and is not described below in detail. The sensor module 411 may produce an electrical signal or data value corresponding to the internal operation state or external environment state of the electronic device 400. The sensor module 411 may include, e.g., a biometric sensor module 411 (e.g., an HRM sensor) disposed on the second surface 410B of the housing 410.

The coupling members 450 and 460 may detachably be fastened to at least portions of the housing 410 via locking members 451 and 461. The coupling members 450 and 460 may include one or more of fastening members, fastening member coupling holes, band guide members, or band fastening rings. The coupling members 450 and 460 may be configured to be mutually coupled or fastened via such structures as fastening members or coupling holes and, when coupled, they together with the housing 410 may form a loop. For example, the coupling members 450 and 460 may be coupled together to surround the user's body portion, thereby fastening the housing 410 or electronic device 400 to the user's body. While the housing 410 or the electronic device 400 is worn or fastened on the user's body, the sensor module 411, e.g., a transparent member 503 described below in connection with FIG. 5, may face or contact the user's body (e.g., skin).

Sensor Configuration

Certain embodiments of a sensor are described below with reference to FIG. 5. In describing the configuration of the sensor, the electronic device according to the prior embodiments may be further referred to as necessary.

Figure 5:
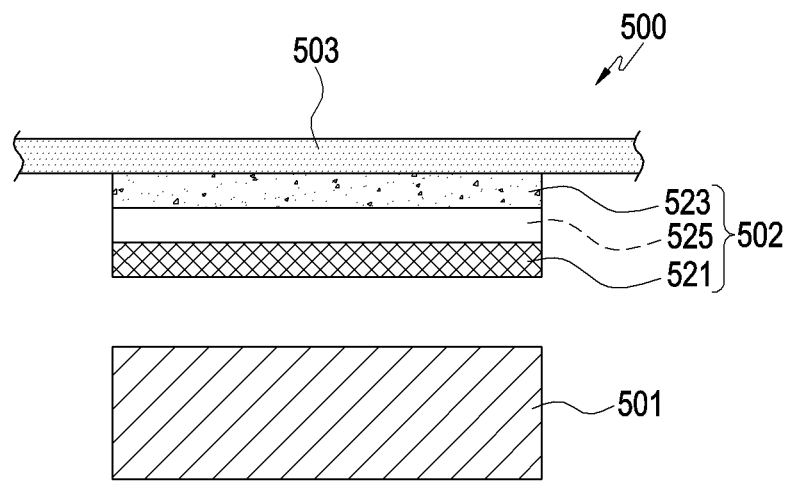
FIG. 5 is a cross-sectional view illustrating a sensor of an electronic device according to an embodiment.
Figure 6:
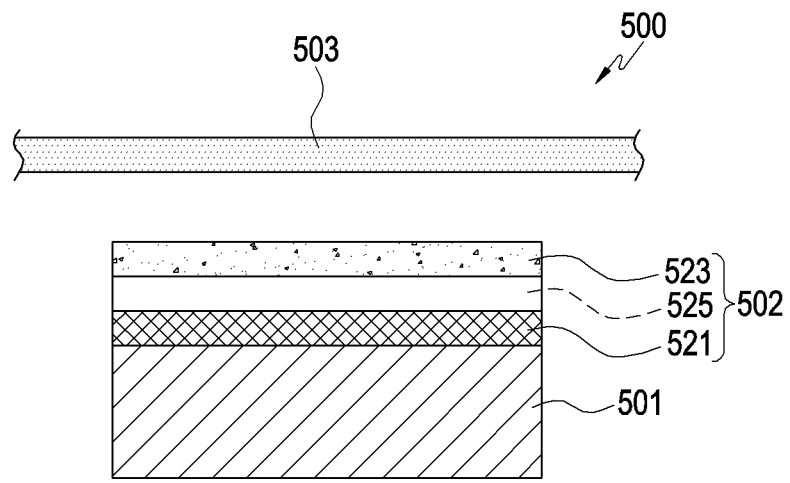
FIG. 6 is a cross-sectional view illustrating an example modification to the sensor of the electronic device according to an embodiment.

FIG. 5 is a cross-sectional view illustrating a sensor 500 of an electronic device according to an embodiment. FIG. 6 is a cross-sectional view illustrating an example modification to the sensor 500 of the electronic device according to an embodiment.

The sensors 500 (e.g., the sensor module 104, 116, or 119 of FIGS. 1 and 2 or the sensor module 411 of FIG. 4) shown in FIGS. 5 and 6 are the same in configuration as each other except for a slight difference in the position of the filter member 502, and the same reference denotations are thus used to refer to the same or substantially the same components.

Referring to FIG. 5 or 6, the sensor 500 may include a biometric sensor. The biometric sensor 500 can be capable of gathering raw biometric data from a user. The raw biometric data can be used for measuring one or more of, e.g., the user's blood pressure, blood flow, heartbeat information (e.g., HRM or HRV), body temperature, respiration rate, oxygen saturation, blood sugar, body fat, calorie consumption, brain wave, skin resistance, electromyogram (EMG), electrocardiogram (ECG), sleep state, facial expression, mydriasis, or eye flickering.

According to an embodiment, the sensor 500 may include an optical sensor 501, a filter member 502, or a transparent member 503. The electronic device (e.g., the electronic device 100 or 400 of FIG. 2 or 4) may obtain first biometric information, such as mean heart rate or heart rate distribution, by analyzing biometric signals and obtain second biometric information, such as stress state or blood vessel aging degree, which is higher dimensional, by processing the biometric information.

According to an embodiment, the optical sensor 501 may include, e.g., a light emitting part and a light receiving part. The light emitting part may emit light of a designated wavelength band and can include a light transmitter, which can include, but is not limited to a Light Emitting Diode (LED). The emitted light may be reflected by an external object to the light receiving part. The light receiving part may obtain light reflected by the external object and produce an electrical signal regarding biometric information based on the reflected light. The light receiving part can include a light receiver, which can include, but is not limited to a charge-coupled device (CCD), photo-diode, light dependent resistor. The configuration of the optical sensor 501 may be described below in greater detail with reference to FIG. 7.

The filter member 502 includes a first optical filter 521 and a second optical filter 523. The first optical filter 521 permits light of a designated wavelength while reflecting light of wavelengths outside the designated wavelength. The second optical filter 523 is less permissive of light of the designated wavelength than the first filter 521, and less permissive of light outside the designated wavelengths than light of the designated wavelengths. In the foregoing manner, the sensor 501 achieves good accuracy. At the same time, the amount of light outside the designated wavelengths that are absorbed by the second filter 523 are sufficient to obscure the sensor. The sensor 501 can be obscured by absorbing sufficient light to attain a brightness that is consistent with light emitted by a display proximate to the sensor.

According to an embodiment, the filter member 502 may include a first optical member (e.g., the first optical filter 521) and a second optical member (e.g., the second optical filter 523). The first optical filter 521 may have a first transmittance (e.g., a transmittance of about 80% or more) for light of a designated wavelength band and may have the property of reflecting light of other wavelength bands than the designated wavelength band. For example, when sunlight is incident onto the sensor 500, the first optical filter 521 may transmit light of a wavelength band from ~455 nm-~465 nm (in certain embodiments, "about" or "~" can mean within 1%), a wavelength band from ~520-~535 nm, a wavelength band from ~655-~665 nm, or a wavelength band from ~930-~955 nm while reflecting light of the other wavelength bands.

Light reflected by the first optical filter 521 may cause glare in the user's eyes, deteriorating the aesthetics of the electronic device (e.g., the electronic device 100 or 400 of FIG. 2 or 4).

According to an embodiment, the second optical filter 523 may transmit light of a wider wavelength band than the first optical filter 521 but, for light of the designated wavelength band of light, the second optical filter 523 may have a second transmittance smaller than the first transmittance. For light of a wavelength band other than the designated wavelength band, the second optical filter 523 may have a transmittance (e.g., about 70% or less) than the second transmittance. According to an embodiment, the second optical filter 523 may absorb light reflected by the first optical filter 521, thereby suppressing or preventing glare or aesthetic deterioration of the electronic device.

The optical properties are summarized in the table below:

| First Optical Filter | Designated Wavelength | $1^{st}$ Transmittance |
| | Outside Designated Wavelength | Reflects |
| Second Optical Filter | Designated Wavelength | $2^{nd}$ Transmittance |
| | Outside Designated Wavelength | $<2^{nd}$ Transmittance |

According to an embodiment, as the second optical filter 523 is disposed further outside than the first optical filter 521 and the first optical filter 521 is disposed between the optical sensor 501 and the second optical filter 523, light reflected by the first optical filter 521 ('second light reflection R' described below in connection with FIG. 8) may be at least partially absorbed by the second optical filter 523. As the amount of second light reflection R absorbed by the second optical filter 523 increases, the sensor 500 may further be hidden in the appearance of the electronic device. According to an embodiment, as the second light reflection R is absorbed by the second optical filter 523, the sensor 500 may be visually hidden although substantially exposed in the appearance of the electronic device. For example, the sensor 500 in the area exposed in the appearance of the electronic device may be implemented to have substantially the same color as the appearance of the electronic device.

According to an embodiment, as the sensor 500 is visually hidden in the appearance, the sensor 500 may be installed in various positions. For example, if the sensor 500 is visually exposed in the appearance, consistency with other components (e.g., the camera module 212 or fingerprint sensor 216 of FIG. 2) may be taken into consideration for the installation position of the sensor 500. However, since the sensor 500 may be visually hidden in the appearance of the electronic device, according to an embodiment, an increased freedom of design may be obtained in light of positions with the other components.

According to an embodiment, the filter member 502 may further include a base film 525. According to an embodiment, the first optical filter 521 or the second optical filter 523 may be formed of a synthetic resin film in which case the first optical filter 521 and the second optical filter 523 may be directly joined (e.g., laminated) together, thereby forming the filter member 502. According to an embodiment, the first optical filter 521 or the second optical filter 523 may be formed by deposition or coating. For example, the first optical filter 521 may be formed on one surface of the base film 525, and the second optical filter 523 may be formed on the opposite surface of the base film 525. The base film 525 may have a substantially larger transmittance for at least sunlight than the first optical filter or second optical filter. According to an embodiment, the base film 525 may be disposed on the optical sensor 501, with the first optical filter 521 facing the optical sensor 501. For example, the second optical filter 523 may be disposed further outside than the first optical filter 521 to at least partially absorb light reflected by the first optical filter 521, thereby suppressing or preventing light leakage to the outside.

According to an embodiment, the transparent member 503 may be formed of, e.g., a transparent synthetic resin, such as acrylic resin, or glass, and the transparent member 503 may substantially form the appearance of the sensor 500. According to an embodiment, the transparent member 503 may form part of the housing, e.g., the housing 110 or 410 of FIG. 2 or 4. According to an embodiment, the transparent member 503 may form part of any one of the first surface 110A, the second surface 110B, or the side surface 110C of FIG. 1 or 2. In the above-described embodiment, the sensor 500 (e.g., the sensor module 219 or 411 of FIG. 2 or 4) or the transparent member 503 may form part of the second surface 110B or 410B of FIG. 2 or 4. According to an embodiment, part of the sensor 500, e.g., the transparent member 503, may substantially form part of the appearance of the electronic device (e.g., the electronic device 100 or 400 of FIG. 2 or 4). The optical sensor or the filter member may be substantially disposed inside the electronic device (e.g., inside the housing 110 or 410 of FIG. 2 or 4). According to an embodiment, the transparent member 503 may be disposed on the second optical filter 523 and may substantially have a larger transmittance, for at least sunlight, than the first optical filter or second optical filter. For example, the second optical filter 523, the first optical filter 521, or the optical sensor 501 may be sequentially disposed inside the transparent member 503, and at least the transparent member 503 may transmit light of any wavelength band.

Referring to FIG. 5, the filter member 502 may be formed so that, e.g., the second optical filter 523 contacts one surface of the transparent member 503. For example, the filter member 502 may be disposed, with the second optical filter 523 tightly contacting one surface (e.g., an inner surface) of the transparent member 503. Referring to FIG. 6, the filter member 502, e.g., the first optical filter 521, may be formed to contact the optical sensor 501. For example, the filter member 502 may be disposed, with the first optical filter 521 tightly contacting the optical sensor 501. According to an embodiment, light may be refracted or reflected while traveling across the interface between two materials with different refractive indexes. For example, light may be refracted or reflected when passing through the interface between the air layer and the first optical filter 521 of FIG. 5 or between the air layer and the transparent member 503 of FIG. 6.

The refraction or reflection of incident light may lower the measurement accuracy of the sensor 500 or the light receiving efficiency of the light receiving part 702. For example, it may be hard to obtain sufficient light power necessary to detect biometric information. According to an embodiment, the material layer between the transparent member 503 and the optical sensor 501 may be minimized by bringing the first optical filter 521 in tight contact with the optical sensor 501 or the second optical filter 523 in tight contact with one surface of the transparent member 503 in disposing the filter member 502. For example, a lowering in the light receiving efficiency of the light receiving part 702 may be prevented by removing at least one air layer between the transparent member 503 and the optical sensor 501. Although such an example configuration is shown that an air layer is disposed between the first optical filter 521 and the optical sensor 501 as shown in FIG. 5 and an air layer is disposed between the second optical filter 523 and the transparent member 503 as shown in FIG. 6, the first optical filter 521 and the second optical filter 523 may be brought in tight contact with the optical sensor 501 and one surface of the transparent member 503, respectively.

Figure 7:
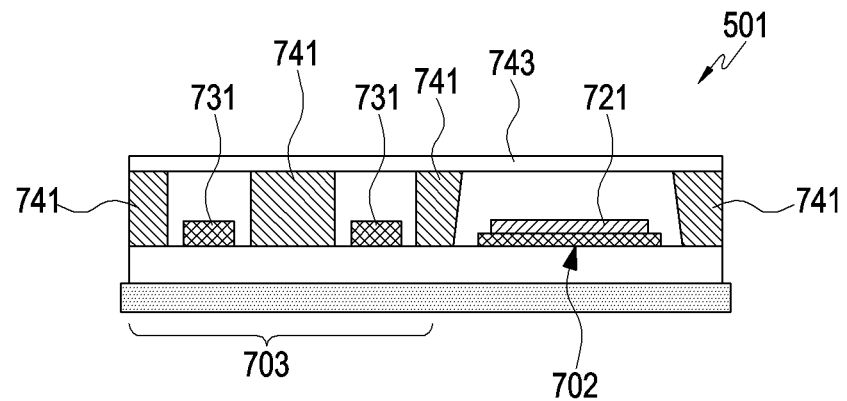
FIG. 7 is a cross-sectional view illustrating an optical sensor among sensors for an electronic device according to an embodiment.

FIG. 7 is a cross-sectional view illustrating an optical sensor 501 among sensors for an electronic device according to an embodiment.

Referring to FIG. 7, the optical sensor 501 may include the whole or part of, e.g., the third sensor module 119 of FIG. 2 or the sensor module 411 of FIG. 4 and may include a light receiving part 702 and a light emitting part 703 implemented on a single substrate 701. The light receiving part 702 may include a light receiving element 721, e.g., a photo diode receiving light and converting the light into an electric signal, and the light emitting part 703 may include a light emitting element 731, e.g., a photo diode receiving electric power or a control signal and emitting light.

According to an embodiment, the light emitting element 731 may emit visible bands of light, e.g., red, green, or blue light or invisible bands of light, e.g., infrared (IR). Generally, detection of biometric information, e.g., heart rate, based on an optical sensor may be performed based on light of any one of an IR, red, or green wavelength band. Percutaneous oxygen saturation may be detected by combining IR light and red light, and blood sugar and blood pressure may be detected using blue light and green light, respectively. A spectrometer might require more wavelength bands of light. For example, in detecting more various biometric information via one sensor, multiple wavelength bands of light corresponding thereto may be radiated to the external object or light reflected by the external object may be obtained.

According to an embodiment, the light receiving part 702 may obtain light which is emitted from the light emitting part 703 and reflected by the external object (e.g., 'incident light' of FIG. 8 or 'first light reflection I' of FIG. 8 described below) and convert the light into an electric signal. According to an embodiment, the light emitting element 731 may emit light of a designated wavelength band, e.g., a visible light wavelength band or IR wavelength band. According to an embodiment, the light emitting element 731 may emit light of at least one of a blue light wavelength band from about 455 nm to about 465 nm, a green light wavelength band from about 520 nm to about 535 nm, a red light wavelength band from about 655 nm to about 665 nm, or an infrared wavelength band from about 930 nm to about 955 nm.

According to an embodiment, when the wavelength band of light emitted from one light emitting element 731 is limited, the optical sensor 501 may produce (or radiate) light of a wavelength band necessary to detect biometric information by including a plurality of light emitting elements. For example, when one light emitting element 731 emits light of at least some of the above-enumerated wavelength bands, light of the remaining wavelength bands may be emitted by further including an additional light emitting element(s). Although FIG. 7 illustrates an example structure in which a pair of light emitting elements 731 is arranged, the number of light emitting elements 731 may properly be selected depending on the specification required for the optical sensor 501.

According to an embodiment, the optical sensor 501 may further include barrier structure(s) 741. The barrier structure 741 may at least partially isolate, e.g., the light receiving element 721 or light emitting element 731 from the external environment. For example, the light receiving element 721 or the light emitting element 731 may obtain light or radiate light to the outside through an area or path defined by the barrier structure 741. According to an embodiment, a sealing member 743 may be disposed on the barrier structure 741 to seal the internal space of the barrier structure 741 from the external space. For example, the sealing member 743 may separate the space where each of the light receiving element 721 and the light emitting element 731 is received from other spaces while transmitting light emitted from the light emitting element 731 or incident onto the light receiving element 721.

Figure 8:
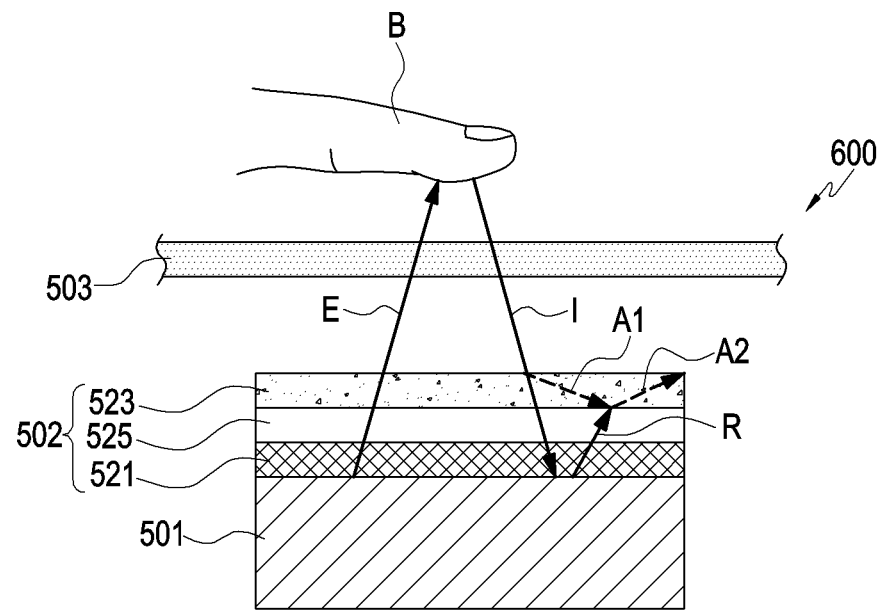
FIG. 8 is a view illustrating a path along which light travels in a sensor of an electronic device according to an embodiment.

FIG. 8 is a view illustrating a path along which light travels in a sensor 500 of an electronic device according to an embodiment.

Referring to FIG. 8, the sensor 500 may emit light using the optical sensor 501, e.g., the light emitting element 731 of FIG. 7. The emitted light (e.g., light reflection E) may be reflected by an external object (e.g., the user's body B). The light reflected by the user's body B (e.g., first light reflection I) may enter back to the optical sensor 501, e.g., the light receiving element 721 of FIG. 7, and the sensor 500 may obtain the first light reflection I through the light receiving element 721. According to an embodiment, when the first light reflection I contains light of a wavelength band other than the designated wavelength band, the first light reflection I may be partially absorbed (A1) by the second optical filter 523 or reflected by the first optical filter 521 (e.g., second light reflection R) and then absorbed (A2) by the second optical filter 523.

According to an embodiment, the sensor 500 may detect or generate biometric information regarding the user's blood flow, heartbeat information, or stress index based on, at least, the first light reflection I obtained through the light receiving element 721. According to an embodiment, the sensor 500, e.g., the light receiving part 702, may detect or generate biometric information by detecting light of the above-described designated wavelength band of light. The first optical filter 521 may transmit light of the designated wavelength band while reflecting light of a wavelength band other than the designated wavelength band. As set forth above, the second optical filter 523 may at least partially absorb the second light reflection R which is light reflected by the first optical filter 521. For example, the second optical filter 523 may partially absorb light beams of the designated wavelength band among light beams incident from the outside. The light of a wavelength band other than the designated wavelength band, although partially transmitted, may be reflected by the first optical filter 521 and then absorbed again by the second optical filter. Thus, the light of the wavelength band other than the designated wavelength band may substantially fail to reach the optical sensor and, albeit reflected by the first optical filter 521, may be attenuated by the second optical filter 523 and thus be prevented from leaking to the outside.

Properties of the Filters

The characteristics of the first optical filter 521 or the second optical filter 523 are described below in greater detail with reference to FIGS. 9 and 10.

FIGS. 9 and 10 are views illustrating the characteristics of an optical filter in a sensor of an electronic device according to an embodiment.

FIG. 9 is a graph representing the transmittance of the first optical filter 521. The first optical filter 521 may have a transmittance of typically more than 80% and up to 90%, for light of the designated wavelength band, e.g., blue light of a wavelength band from about 455 nm to about 465 nm, green light of a wavelength band from about 520 m to about 535 nm, red light of a wavelength band from about 655 nm to about 665 nm, or infrared light of a wavelength band from about 930 nm to about 955 nm. According to an embodiment, the first optical filter 521 may have a significantly reduced transmittance (e.g., a transmittance of about 20% or less) for light of wavelength bands other than the designated wavelength band. According to an embodiment, the first optical filter 521 may reflect light of wavelength bands other than the designated wavelength band.

According to an embodiment, the sensor (e.g., the sensor 500 of FIG. 8) may substantially detect or generate a biometric signal based on light of the designated wavelength band. A light of other wavelength bands of light than the designated wavelength band may serve as noise signals in the sensor 500. The first optical filter 521 with the above-described transmittance property may have a transmittance of about 80% or more or about 90% for light of the designated wavelength band and reflect light of the other wavelength bands of light, thereby blocking off noise signals coming into the sensor 500. For example, the first optical filter 521 may have a sufficient transmittance for light of the designated wavelength band of light and block wavelength bands of light which may function as noise signals or light unnecessary to detect biometric information, thereby increasing the measurement accuracy of the sensor 500.

According to an embodiment, it has been described above that the first optical filter 521 may enhance the measurement accuracy of the sensor 500 but deteriorate the aesthetics of the electronic device by reflecting light of other wavelength bands than the designated wavelength band. The second optical filter 523 may prevent the second light reflection R from leaking out, thereby causing a glare, by absorbing, at least, light reflected by the first optical filter 521 (e.g., the second light reflection R of FIG. 8).

FIG. 10 is a graph representing the transmittance of the second optical filter 523. The second optical filter 523 may have a transmittance of substantially 80% or more for light of the designated wavelength band but slightly smaller than the transmittance of the first optical filter 521 and may have a transmittance of about 60% or more for light of some wavelength bands wider than the designated wavelength band. For example, light of other wavelength bands than the designated wavelength band may be drastically attenuated while passing through the second optical filter 523.

According to an embodiment, when the second optical filter 523 has a transmittance of about 60% for light of a corresponding wavelength band of light, light which has a wavelength band other than the designated wavelength band and a light power of about 100 cd may be attenuated to less than about 60% while first passing through the second optical filter 523. For example, 40% of the light of the other wavelength band than the designated wavelength band may be absorbed by the second optical filter 523. The first-attenuated light may be attenuated to less than about 36 cd while being reflected by the first optical filter 521 and then transmitted, secondly, through the second optical filter 523. For example, after the light reflected by the first optical filter 521 is transmitted through the second optical filter 523, the light may be attenuated to a power of less than about 36% as compared with the initial incident light. As such, as the second optical filter 523 absorbs light of the other wavelength bands than the designated wavelength band, the power of light reflected by the sensor 500 or the first optical filter 521 may be attenuated to less than about 50% as compared with the initial incident light. For example, although the light reflected by the first optical filter 521 is partially radiated to the outside, this may be substantially similar in strength to the light reflected on the surface of the electronic device (e.g., the electronic device 100 or 400 of FIG. 2 or 4), causing the sensor to be obscured by the absorbed light, wherein the light is absorbed at a degree that is similar to the reflectance of other light from the optical sensor 501. Thus, while suppressing or mitigating external leakage of the second light reflection R, the sensor 500 may be visually hidden from the surface of the electronic device appearing inconspicuous with the remainder of the electronic device.

FIG. 11 is a view illustrating the characteristics of a hybrid filter combining a first optical filter and a second optical filter in a sensor of an electronic device according to an embodiment.

According to an embodiment, although the first optical filter 521 and the second optical filter 523 have the optical characteristics set forth above in connection with FIG. 9 or 10, a hybrid filter actually produced by combining the first optical filter 521 and the second optical filter 523 might not present an exact combination of the optical characteristics of FIGS. 9 and 10. For example, the characteristics of the optical member shown in FIG. 9, 10, or 11 are merely an example and it should be noted that embodiments of the disclosure are not limited thereto.

Referring to FIG. 11, a combination of the first optical filter 521 and the second optical filter 523 may allow the filter member 502 to have a substantially similar transmittance to the first optical filter 521 while mitigating or preventing light reflection. For example, the first optical filter 521 or the second optical filter 523 may have a transmittance of about 80% or more for light of the designated wavelength band, and the filter member 502 including the first optical filter 521 and the second optical filter 523 may also have a transmittance of about 80% or more for light of the designated wavelength band.

According to an embodiment, as the first optical filter 521 reflects light of other wavelength bands than the designated wavelength band and allows light of the designated wavelength band to enter the light receiving part 702 thereby giving the sensor 500 enhanced measurement accuracy. The second optical filter 523 may absorb the light reflected by the first optical filter 521. For example, the second optical filter 523 may have a transmittance of less than about 70% for light of the other wavelength bands than the designated wavelength band and may thus absorb light reflected by the first optical filter 521 to the outside and prevent light reflection from spoiling the appearance of the electronic device (e.g., the electronic device 100 or 400 of FIG. 2 or 4). According to an embodiment, although the sensor 500 is exposed in the appearance of the electronic device, it may be visually hidden by the second optical filter 523 and, thus, the freedom of design may be enhanced, e.g., in choosing the installation position of the sensor 500.

As set forth above, according to an embodiment, an electronic device (e.g., the electronic device 100 or 400 of FIG. 2 or 4) comprises a transparent member (e.g., the transparent member 503 of FIG. 5), an optical sensor disposed under the transparent member and including a light emitting part (e.g., the light emitting part 703 of FIG. 7) configured to emit light of a designated wavelength band and a light receiving part (e.g., the light receiving part 702 of FIG. 7) configured to obtain a reflection (e.g., the first light reflection R of FIG. 8) of the designated wavelength band light (e.g., the light reflection E of FIG. 8) emitted from the light emitting part and reflected by an external object adjacent to the transparent member, a first optical filter (e.g., the first optical filter 521 of FIG. 5) disposed between the transparent member and the optical sensor, having a first transmittance for light of the designated wavelength band, and having a reflection property to reflect a light, and a second optical filter (e.g., the second optical filter 523 of FIG. 5) disposed between the transparent member and the first optical filter, having a second transmittance smaller than the first transmittance for light of the designated wavelength band, and having an absorption property to absorb at least part of the light (e.g., the second light reflection R of FIG. 8) reflected by the first optical filter.

According to an embodiment, the designated wavelength band may include at least one of a wavelength band from 455 nm to 465 nm, a wavelength band from 520 nm to 535 nm, a wavelength band from 655 to 665 nm, or a wavelength band from 930 nm to 955 nm.

According to an embodiment, the electronic device may further comprise a housing including a first surface, a second surface facing away from the first surface, and a side surface surrounding a space between the first surface and the second surface. The first optical filter, the second optical filter, and the optical sensor may be disposed inside the housing. The transparent member may form part of a surface, facing the light receiving part and the light emitting part, of the first surface, the second surface, or the side surface.

According to an embodiment, the second optical filter may be disposed in tight contact with one surface of the transparent member.

According to an embodiment, the electronic device may further comprise a base film (e.g., the base film 525 of FIG. 5) having one surface where the first optical filter is formed and another surface where the second optical filter is formed. The base film may be disposed on the optical sensor, with the first optical filter facing the optical sensor.

According to an embodiment, a sensor (e.g., the sensor 500 of FIG. 5 or 6) comprises a light receiving part, a first optical member disposed on the light receiving part to transmit light of a designated wavelength band to the light receiving part, and a second optical member disposed on the first optical member to transmit, at least, light of the designated wavelength band. The first optical member may be configured to reflect light of a wavelength band other than the designated wavelength band, and the second optical member may be configured to at least partially absorb the light reflected by the first optical member.

According to an embodiment, the designated wavelength band may include at least one of a wavelength band from 455 nm to 465 nm, a wavelength band from 520 nm to 535 nm, a wavelength band from 655 to 665 nm, or a wavelength band from 930 nm to 955 nm.

According to an embodiment, a combination of the first optical member and the second optical member may have a transmittance of 80% or more for light of the designated wavelength band.

According to an embodiment, the sensor may further comprise a base film having one surface where the first optical member is formed and another surface where the second optical member is formed. The base film may be disposed on the light receiving part, with the first optical member facing the light receiving part.

According to an embodiment, the sensor may further comprise at least one light emitting element disposed adjacent the light receiving part. The light receiving part may be configured to receive light emitted from the light emitting element and reflected by an external object.

According to an embodiment, the sensor may further comprise a transparent member disposed on the second optical member.

According to an embodiment, the second optical member may be disposed in contact with an inner surface of the transparent member.

According to an embodiment, an electronic device comprises a housing including a first surface, a second surface facing away from the first surface, and a side surface surrounding a space between the first surface and the second surface and a sensor disposed inside the housing and configured to receive light through at least part of any one of the first surface, the second surface, or the side surface. The sensor may include a light receiving part, a first optical filter disposed on the light receiving part to transmit light of a designated wavelength band to the light receiving part, and a second optical filter disposed on the first optical filter to transmit, at least, light of the designated wavelength band. The first optical filter may be configured to reflect light of a second wavelength band other than the designated wavelength band, and the second optical filter may be configured to at least partially absorb the light reflected by the first optical filter.

According to an embodiment, the sensor may further include a transparent member disposed on the second optical filter. The transparent member may form part of an outer surface of any one of the first surface, the second surface, or the side surface.

According to an embodiment, the second optical filter may be disposed in contact with an inner surface of the transparent member.

According to an embodiment, the designated wavelength band may include at least one of a wavelength band from 455 nm to 465 nm, a wavelength band from 520 nm to 535 nm, a wavelength band from 655 to 665 nm, or a wavelength band from 930 nm to 955 nm.

According to an embodiment, the sensor may further include a base film. The first optical filter and the second optical filter, respectively, may be formed on one surface and another surface of the base film.

According to an embodiment, the sensor may further include a transparent member (e.g., a glass plate) disposed on the second optical filter. The second optical filter may be formed in contact with an inner surface of the transparent member.

According to an embodiment, the electronic device may further comprise a coupling member connected to at least part of the housing wearably fastening the housing to a user's body part.

According to an embodiment, the sensor may be disposed to face the user's body or skin while being worn on the user's body.

As is apparent from the foregoing description, according to certain embodiments, a sensor or an electronic device including the sensor may include a first optical filter to transmit light of a designated wavelength band, thereby allowing for increased accuracy in measuring biometric information. According to certain embodiments, a sensor or an electronic device including the sensor may include a second optical filter to absorb light reflected by the first optical filter or light generated inside the sensor, e.g., other wavelength bands of light than a designated wavelength band. For example, according to an embodiment, a sensor or an electronic device including the sensor may include a second optical filter, thereby preventing part of the sensor (e.g., a photo diode for a light receiving part) from being exposed in the appearance and preventing aesthetic deterioration of the appearance of the electronic device due to light reflected by, at least, the first optical filter.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A sensor, comprising:
   a light receiver;
   a first optical member disposed on the light receiver to transmit light having a designated wavelength band to the light receiver, and configured to at least partially reflect light having wavelengths lower than the designated wavelength band and light having wavelengths higher than the designated wavelength band; and
   a second optical member disposed on the first optical member to transmit, at least, light of the designated wavelength band and configured to at least partially absorb the light reflected by the first optical member;
   wherein the designated wavelength band is 930 nm to 955 nm; and
   wherein a combination of the first optical member and the second optical member has a transmittance of 80% or more for light of the designated wavelength band of light.

2. The sensor of claim 1, further comprising a base film including one surface where the first optical member is formed and another surface where the second optical member is formed, wherein the base film is disposed on the light receiver, with the first optical member facing the light receiver.

3. The sensor of claim 1, further comprising at least one light emitting element disposed adjacent the light receiver, wherein the light receiver is configured to receive light emitted from the light emitting element and reflected by an external object.

4. The sensor of claim 1, further comprising a transparent member disposed on the second optical member.

5. The sensor of claim 4, wherein the second optical member is disposed in contact with an inner surface of the transparent member.

* * * * *